United States Patent [19]
Kunert

[11] 3,757,988
[45] Sept. 11, 1973

[54] SHATTERING FRANGIBLE OBJECTS, PARTICULARLY PLATES

[75] Inventor: Heinz Kunert, Koln, Germany

[73] Assignee: Saint-Gobain, Neuilly-sur-Seine, France

[22] Filed: June 10, 1971

[21] Appl. No.: 151,850

[30] Foreign Application Priority Data
June 10, 1970 Germany.................. P 20 28 350.1

[52] U.S. Cl............................... 220/47, 220/89 A
[51] Int. Cl...................... B65d 43/02, B65d 25/00
[58] Field of Search........................... 220/89 A, 47; 89/1.702; 85/37, 65

[56] References Cited
UNITED STATES PATENTS
2,436,364   2/1948   McDowell....................... 220/89 A
3,268,009   8/1966   Bussey et al..................... 220/89 A
3,221,495   12/1965  Tweet............................. 220/89 A FOREIGN PATENTS OR APPLICATIONS
125,126   4/1919   Great Britain.................... 89/1.702

Primary Examiner—George T. Hall
Attorney—Arthur W. Dew and John L. Seymour

[57]          ABSTRACT

Wall means comprising a pane of tempered glass transpierced by a hole, an explosive device comprising oppositely disposed hollow bullets sharing a common explosive charge disposed in the hole, means to direct the bullets against the wall of the hole, means to fire the charge, and closure means sealing both faces of the hole.

20 Claims, 3 Drawing Figures

Patented Sept. 11, 1973
3,757,988
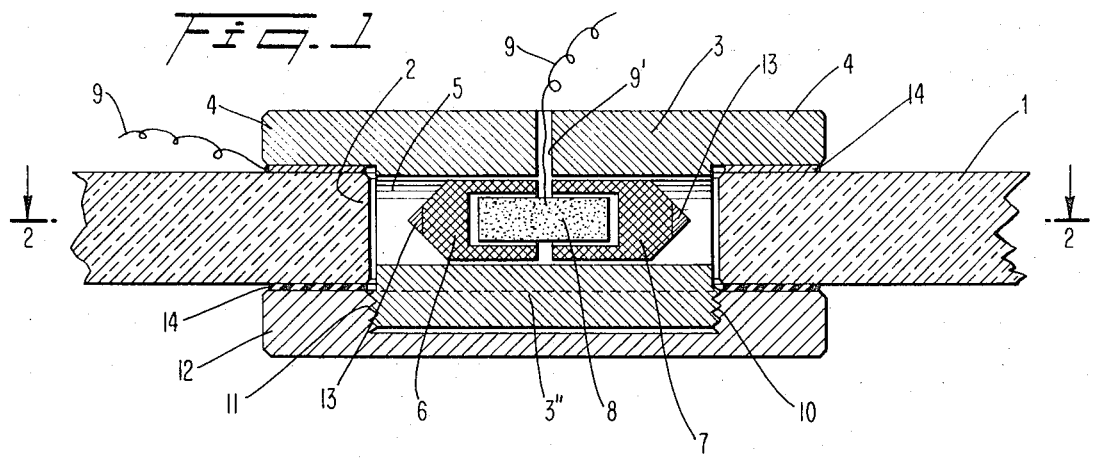
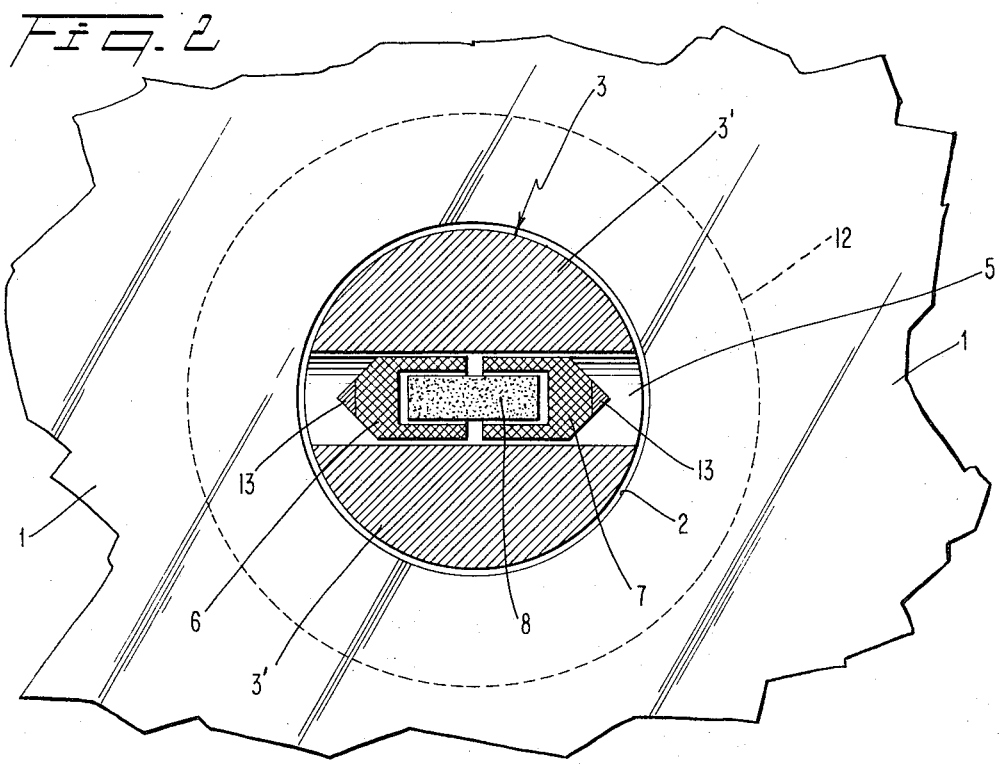
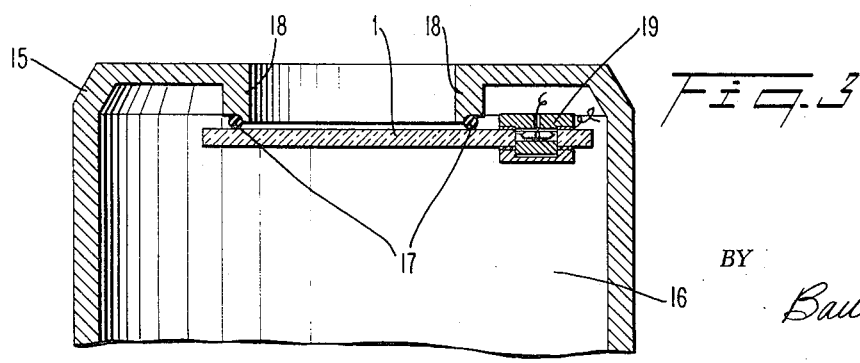
INVENTOR.
HEINZ KUNERT
BY Bauer and Seymour
ATTORNEYS

SHATTERING FRANGIBLE OBJECTS, PARTICULARLY PLATES

This invention relates to explosive devices of disruption operable from a distance. The invention is particularly useful in shattering panes of glass such as the tempered glass of automobile windshields and will be described in that use as a preferred mode, but it is to be understood that it can also be used to shatter glass or ceramic seals which retain pressures within containers, to release the gases. It is useful against all frangible materials.

It has been proposed to use explosive devices to shatter glass panes, particularly safety glass panes used as security doors and windows for habitations and for vehicles. Such a proposal is described in French Pat. 1,436,815 wherein the pane to be destroyed is the windshield of an automobile, the disruption being accomplished by electrically igniting an explosive charge. Security glass is found today in many uses, in automobiles, and it is sometimes necessary to shatter it quickly, but prior attempt to do so have been obstructed by numerous difficulties of accomplishment touching certainty of operation, speed of response, danger, permanence of attachment, weight, size, and obstruction of vision. Meeting these difficulties has led to apparatus costly and uncertain in operation. Strictly mechanical devices are slow in operation and explosive devices have required excessive size and protection from accidental operation, have tended to interfere with vision, and have been uncertain in operation.

It is an object of the invention to shatter frangible objects by explosive means under complete control without danger to persons in the vicinity. A particular object is to shatter a pane of tempered glass instantaneously and safely for the accomplishment of such tasks as removing a windshield, releasing a gas from a pressured container, and destroying any sort of tempered glass object by remote control. Other objects will appear as the description proceeds.

The objects of the invention are accomplished generally speaking, for instance in providing an automobile windshield with such a device, by providing a tempered glass windshield with an aperture or recess extending into or preferably through the thickness of the glass, and mounting an explosive device having oppositely disposed bullets assembled with an explosive charge and directed against the wall of the aperture. The course of the bullets is controlled and adequate guards protect the passengers. The firing may be accomplished by hand or by automatic means such as a contact switch operable by external forces such as impact. As the typical windshield has a thickness on the order of one-quarter inch the size of such devices for windshield use is small.

According to the invention the destructive apparatus comprises an explosive charge and a bullet placed within a hole in the windshield so that, when fired, the bullet will strike the encircling wall of the hole.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a section through a glass pane containing a preferred form of device using two, oppositely disposed bullets sharing a common explosive charge;

FIG. 2 is a section on line II—II of FIG. 1; and

FIG. 3 is a section through the orifice of a canister containing a gas under pressure, sealing being by a gasketed glass plate containing an explosive charge, this being another example of the uses of the invention.

Referring to FIGS. 1 and 2, the tempered glass pane 1 is pierced by a circular hole 2. When the glass pane is in a window this orifice is situated near the edge of the pane in a location out of the line of vision. The hole 2 receives a box 3. The box has a circular head 4 of large diameter which bears against one of the faces of the pane 1, while its body, fitting the hole, is traversed by a circular passage 5 opening against opposite parts of the wall of hole 2. Within the passage 5 are two cylindrical bullets 6 and 7 the points of which are directed against the wall of the hole. The bullets are hollow and receive an explosive charge 8 which is fired electrically by a cable 9 embedded in the charge and fired by external means of known type. When fired, the charge projects the bullets 6, 7 against the wall of the hole and shatters the glass. The cylindrical body of the box 3 carries, opposite the head 4 a screw thread 10 which is outside the hole and accepts the interior screw thread 11 of circular head 12 which may be of a diameter like that of head 4. The bullets may be provided with hard points 13 of metal, stone, or ceramic. Gaskets 14 make the box tight.

The device operates as follows: The box, in the case of a tempered glass windshield provided prior to tempering with a circular hole 2, is circular and of a size in its cylindrical part to fit the hole. A gasket 14 overlies the edge of the hole and the projecting rim 4 of the box bears upon the gasket. The box may be of solid metal or other non-frangible material. A hole 5 constituting a sort of barrel is provided in the cylindrical body of the box, opening at both ends and surrounded by head 4, sides 3'—3' and bottom 3''. The hollow bullets 6–7 sharing the explosive charge 8 are midway in the barrel. The firing wire 9 enters and is embedded in the charge through a tiny hole 9' in the head 4. The head 12 is screwed in place against gasket 14 and the explosive device is ready for operation. This operation may be manually controlled by a person controlling a switch, or by other known means.

When the charge is fired the bullets are projected through the barrel 5 against opposite parts of the wall of the hole and parallel to the plane of the glass, shattering the glass.

Among means for firing this device are circuits controlled by radio telephone or enclosures provided with heating resistances. Being known they are not herein described.

In the form of the invention of FIG. 3 a reservoir 15 for gases 16 under pressure is provided with an aperture and inwardly extending collar 18 which is sealed by a glass plate 1, bearing against a gasket 17 mounted on the inwardly extending collar. An extension of the glass plate is pierced by a hole in which is placed the explosive device 19. The pressure inside the reservoir maintains the seal by pressing the plate against the gasket. Locating the charge 19 outside the aperture prevents it from being projected outward when the gases under pressure are released. Firing can be by any known means including the above.

It will be perceived that the invention overcomes the difficulties recited hereinabove by firing a bullet or bullets against the wall of an aperture in a thickness of a wall of frangible material and parallel to the plane of the pane or wall. The charge is contained in a box provided with a barrel which directs the bullet against the wall of the aperture and contains the charge. It is preferred that the barrel open at both ends and that two bullets receive the explosive charge between them, as this provides certainty and efficiency of operation.

There are numerous uses for this explosive device: For instance, in the so-called air bag system a folded bag placed before a passenger is to be filled with gas from a reservoir under pressure in a fraction of a second in case of collision. A large, sealed aperture is provided as in FIG. 3 to be opened instantaneously and completely to inflate the sack in a quasi-explosive manner to prevent the shock wave from producing auditory lesions; the explosive closure of this invention is perfectly adapted to this purpose. From this viewpoint, the pane involved can be the windshield, the back window, or a side window. The firing of the charge in the window and the filling of the sac before the passenger by firing the charge in closure can be initiated by the same electrical impulse. For the release of gases through large openings sealed by frangible plates, the present invention is perfectly adapted: the full opening is instantly freed, the disruptive apparatus is small, is light, is certain in operation, is not dangerous, and needs no attention during normal times.

The method and apparatus for generating the current which fires the charge are of various known types and need no description.

As many apparently widely different embodiments of the present invention may be made without departing from the spirit and scope thereof, it is to be understood that the invention is not limited to the specific embodiments.

What is claimed is:

1. An explosive device comprising a box adapted to fit a recess in a pane or plate of frangible material, guide means in the box, bullet means in the guide means, an explosive charge associated with the guide means, and means to fire the charge whereby to project the bullet means through the guide means against the wall of the recess.

2. Frangible wall means comprising a plate having a recess therein, an explosive device according to claim 1 positioned in the recess, said device including barrel means aimed at the wall of the recess, oppositely directed bullet means in the barrel means, means to mount the device in the recess, the explosive charge being between the bullet means and acting on both.

3. Wall means according to claim 2 comprising a pane of tempered glass.

4. Wall means comprising a pane of tempered glass transpierced by a hole, an explosive device comprising oppositely disposed hollow bullets sharing a common explosive charge disposed in the hole, means to direct the bullets against the wall of the hole, means to fire the charge, and closure means sealing both faces of the hole.

5. Wall means according to claim 4 in which the closure means comprises a capped cylindrical body projecting through and beyond the hole, apertured to receive the explosive device, and shaped to receive and retain a cooperating cap.

6. Wall means according to claim 5 in which the capped cylindrical body is solid except for a transversely extending slot in which the explosive charge and bullet means are emplaced.

7. Wall means adapted to close an aperture comprising a pane of frangible material, an aperture therein penetrating the wall means transversely to its length, explosive device disposed in the aperture comprising bullet means directed against the wall of the aperture parallel to the faces of the sheet, an explosive charge associated with the bullet means, and means to fire the explosive charge to propel the bullet means against the side of the aperture.

8. Wall means according to claim 7 comprising a tempered glass plate closing an aperture in a container under pressure, and means associated with the aperture and the wall means to seal the container, the explosive device being located in the wall means outside the aperture.

9. The method of shattering a frangible pane which comprises mounting bullet means and an explosive charge in the thickness of the pane with the bullet means directed toward the thickness of the pane, and firing the explosive charge, thereby propelling the bullet means against the thickness of the pane.

10. The method of claim 9 in which the pane is tempered glass.

11. Wall means according to claim 7 in which the bullet means consists of oppositely directed hollow bullets sharing a common explosive charge, the points of the bullets being hard, and the hollows containing at least a part of the explosive charge.

12. A glass pane having mounted within the thickness of the glass an explosive device as described in claim 1.

13. In combination, tempered flat glass having disposed within its thickness an explosive charge, a bullet, means to guide the bullet against the cross section of the glass, and means to fire the charge.

14. A tempered glass window equipped with apparatus of destruction comprising an aperture in the glass, an explosive charge in the aperture, electrical firing means for the charge, and means to confine the explosion within the aperture.

15. A window according to claim 14 in which the hole is occupied by a box provided with rims overlying the edge of the hole, and with internal guide means containing the charge and projectile means directed upon the cross section of the glass.

16. A window according to claim 15 in which the guide means comprises a barrel open at both ends containing oppositely directed bullets between which is lodged the explosive charge.

17. A window according to claim 14 in which the box fits the hole in the glass and is composed of strong, interfitting parts which, when joined, grip the rim of the hole, within which a barrel, open at both ends, contains oppositely directed bullets between which is lodged the explosive charge.

18. Apparatus according to claim 1 in which the window is in the mouth of a container of compressed gas, and the container is connected to an expansible sack.

19. A vehicle having a tempered glass window equipped as in claim 14.

20. A frangible vehicle windshield having a recess let into the thickness of the glass, a box comprising interfitting, screw threaded parts having caps overlying the edge of the recess and gripping the glass between them, said box including matching blocks in the thickness of the glass defining between them and with the caps a barrel open at both ends, a pair of oppositely directed bullets mounted in the barrel, an explosive charge mounted within the barrel between the bullets, and means to fire the charge electrically.

* * * * *